B. F. WITT.

Binders' Attachments for Harvesters.

No. 6,033. Reissued Aug. 25, 1874.

Witnesses.

D. P. Cowl

Edmund Masson

Inventor.

Bennett F. Witt.

Assignor to Henry F. Mann.

By Atty. A. B. Stoughton.

THE NORRIS PETERS CO., PHOTO-LITHO., WASHINGTON, D. C.

UNITED STATES PATENT OFFICE.

BENNETT F. WITT, OF DUBLIN, INDIANA, ASSIGNOR TO HENRY F. MANN, OF PITTSBURG, PENNSYLVANIA.

IMPROVEMENT IN BINDERS' ATTACHMENTS FOR HARVESTERS.

Specification forming part of Letters Patent No. 27,852, dated April 10, 1860; extended seven years; reissue No. 6,033, dated August 25, 1874; application filed June 12, 1874.

*To all whom it may concern:*

Be it known that BENNETT F. WITT, of Dublin, in the county of Wayne and State of Indiana, did invent a new and useful Improvement in Harvesting-Machines; and that the following is a full, clear, and exact description of the same, reference being had to the accompanying drawings making a part of this specification, in which—

Figure 1:
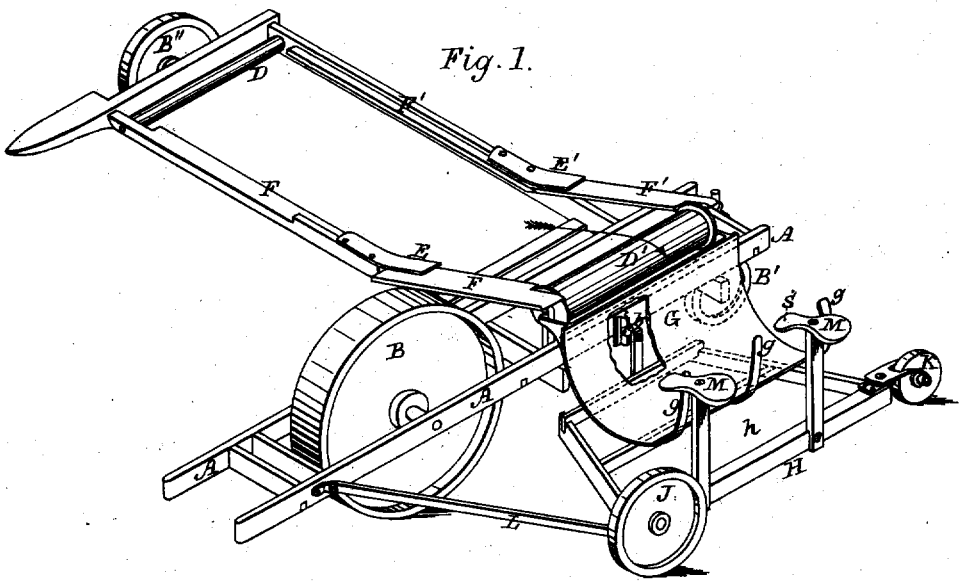
Figure 2:
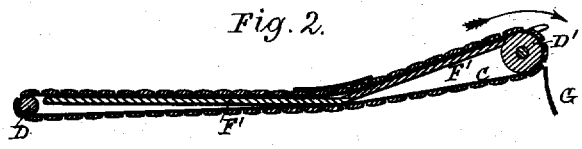
Figure 3:
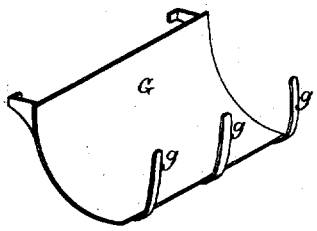
Figure 4:
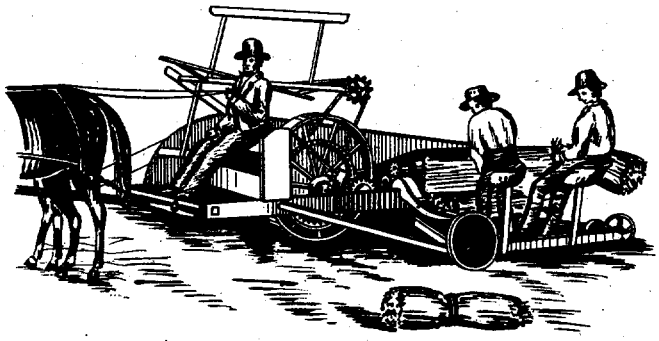

Figure 1 represents a perspective view of a portion of a machine having these improvements combined therewith. Fig. 2 represents a longitudinal section through the apron. Fig. 3 is a detached view in perspective of the cradle or receiver, and Fig. 4 represents the machine and apparatus as they appear in operation in the field.

Like letters of reference indicate like parts in each.

This invention relates to an improvement in that class of harvesting-machines in which, by an elevating apparatus having a side delivery, the cut grain is discharged into a grain-receptacle in convenient position and in suitable condition to be removed therefrom by the binders, who ride while at work; and the nature of it consists partly in combining with the elevating apparatus and grain-receptacle of such a machine a binder-carriage, supported at one side by wheels, and at the other side coupled to the side of the machine, so that the grain-platform, elevating apparatus, grain-receiver, and binders' carriage shall all be in proper line or range with each other. Another part of this invention consists in the combination, hereinafter set forth, of binders' seat or seats, grain receiver or receptacle, and elevating apparatus in a machine of the class above referred to.

To enable others skilled in the art to make and use this invention, its construction and mode of operation are described as follows:

A represents the frame of a machine of the class designated, supported on wheels B B′ B″. C is an endless apron, stretched and revolving, as indicated by arrows, around rollers D D′, journaled in the frame. The bent guides E E′ above the apron, and slats F F′ between its upper and lower portions, and extending from roller to roller, perform the function of guiding the apron in its motion, so that in the rear of the cutters it shall move horizontally, but so that so much or such parts of it as enter into the elevating apparatus shall incline upward over the frame of the machine to the desired point of discharge. At the side of the machine, below the point of the discharge of the cut grain from the elevating apparatus and above the binders' platform, hereinafter described, is arranged a concave receiver or cradle, G. The apron C receives the cut grain as it falls, and, carrying it sidewise and upward over the roller D′, delivers it with no material disturbance into the receiver G, within which it is retained by fenders *g*, attached to the outer edge of the receiver, and placed at such intervals apart as not to prevent the ready removal of the grain by the binders. This receiver is arranged in convenient position to receive the cut grain from the elevating apparatus, and the grain thus continuously deposited accumulates therein till a gavel is formed, when it is removed directly therefrom and bound by the binders, whose seats are constructed and arranged with reference to the work required, as will now be explained.

The binders' platform *h* is made as a part of the carriage H, which is supported a short distance above the ground by means of wheels J K at its outer edge, its inner edge being supported by means of an adjustable hinge-coupling, *b*, to such part of the frame A as to bring the platform *h* in line with the delivery of the apron C, and on a level or plane below the grain-receiver G. The carriage is further secured in the proper position in relation to the frame A by means of a brace, L, loosely shackled to the frame A and platform *h*, respectively, thus permitting the carriage H to adapt itself to the irregularities of the surface of the ground.

To facilitate the labor of the binders one or more seats, M, are mounted upon the frame H, in range with the elevating apparatus and receiver, and are so placed as to serve the purposes of supports and stay to the binders, as represented in the drawings, while engaged in the work of removing the gavels from the grain-receptacle and binding them into bundles.

Fig. 4 exhibits the manner in which the grain is delivered to the cradle or receptacle, the position of the binders on their seats, the arrangement of the seats with reference to the elevating apparatus and receiver, and the mode of operation involved in the use of the machine.

The seats M, of saddle form, which is believed to be the best, provide a convenient support, rest, or stay to the binders, in connection with the platform below. The seats are made with a forward projection, as shown at S, so as to afford a lateral support to the binders when standing, in case they desire to stand, and also a convenient table or rest upon which the binding may be performed.

Another and independent element of utility attained by the construction set forth is, that the binders can, at pleasure, change from a sitting to a standing position, or vice versa, according to the work to be done, or according to their individual feelings or preferences, and when standing they may rest or steady themselves by the seats, either standing against or astride of them; or they may slip off their seats, in order the more easily to lift a gavel from the receiver, and sit down again to bind it, without effort or loss of time.

When the straw is light and of good length a single binder will suffice. The invention is not limited in its combinations to machines in which the endless apron C is employed, but may be applied to various descriptions of harvesters constructed to deliver grain by an elevated side delivery.

What is claimed herein as the invention of the said BENNETT F. WITT, and desired to be secured by Letters Patent, is—

1. The carriage or frame H, supported at one side upon wheels J K, and coupled loosely to the side of a harvesting-machine, having an elevated side delivery, and in combination with the elevating apparatus and grain-receiver of such machine, substantially as set forth.

2. In combination with receiver G, the seat or seats M, formed with a front projection, so that such seat or seats shall afford a lateral support for the binders, and also a rest or table upon which the binding may be performed.

H. F. MANN.

Witnesses:
GEORGE H. WOODS,
C. S. FETTERMAN.